(12) United States Patent
Quijano

(10) Patent No.: US 8,465,076 B1
(45) Date of Patent: Jun. 18, 2013

(54) CONSOLE ASSEMBLY

(75) Inventor: Jonathan Joseph Quijano, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/436,001

(22) Filed: Apr. 2, 2012

(51) Int. Cl.
*B60R 7/04* (2006.01)
(52) U.S. Cl.
USPC ........................................ 296/37.8; 296/24.34
(58) Field of Classification Search
USPC .............................................. 296/97.8, 24.34
See application file for complete search history.

(56) References Cited

U.S. PATENT DOCUMENTS 7,784,843 B2 * 8/2010 Lota et al. .................. 296/24.34

* cited by examiner

*Primary Examiner* — Joseph Pape
(74) *Attorney, Agent, or Firm* — Gifford, Krass, Sprinkle, Anderson & Citkowski, P.C.

(57) ABSTRACT

A console assembly having a first storage area and a second storage area, wherein access to the first storage area is possible without having to remove articles supported on the outer surface of the console assembly is provided. The console assembly includes a slidable support is operable to slide between a covered position and a retracted position. In the covered position the slidable support covers the first storage area, and in the retracted position the slidable support is disposed within the second storage area, between each of the pair of second side walls.

5 Claims, 5 Drawing Sheets

CONSOLE ASSEMBLY

FIELD OF THE INVENTION

The invention relates to a console assembly for use in an automotive vehicle. The console assembly is configured to hold an electronic device while allowing users to access a storage area.

BACKGROUND OF THE INVENTION

Console assemblies include a housing for storing articles. Some console assemblies also include a storage area having ports for connecting electronic devices. Some of the ports are operable to charge the electronic device, while others are also configured to transmit data between the electronic device to the vehicle so as to play music through the vehicle's audio system, such as a port commonly referenced as a Universal Serial Bus (USB).

Various portions of current console assemblies have surfaces configured to support an article such as an electronic device. Certain support surfaces also serve as covers for storage areas. Thus, accessing the respective storage area requires removal of the article. In some current console assemblies, the storage area having the ports is covered. Thus, utilization of the ports require the storage area to remain exposed.

SUMMARY OF THE INVENTION AND ADVANTAGES

The present invention provides for a console assembly having a first storage area and a second storage area, wherein access to the first storage area is possible without having to remove articles supported on the outer surface of the console assembly.

The first storage area includes a first floor, a pair of first side walls, a first front wall, and a first back wall. The second storage area may include a pair of second side walls, a second back wall, and a second opening spaced apart and opposite the second back wall. The second opening extends between each of the pair of second side walls. The second storage area is disposed above the first floor of the first storage area. The second opening generally is coplanar with respect to the first back wall of the first storage area.

A slidable support is operable to slide between a covered position and a retracted position. In the covered position the slidable support covers the first storage area, and in the retracted position the slidable support is disposed within the second storage area, between each of the pair of second side walls. The slidable support is configured to support a handheld electronic device such as a cellular phone, smart phone or a handheld musical device such as an Ipod®. The slidable support may be disposed along a plane that is angled relative the first floor of the first storage area. Accordingly, the console assembly is operable to allow the use to utilize a support surface without having to remove the article to access contents within a first storage area.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a console assembly 10 for use in an automotive vehicle 12 is provided. The console assembly 10 is disposed between a front passenger and driver seat (not shown). The console assembly 10 may be formed of a polymer through an injection molding process.

The console assembly 10 includes a first storage area 14. The first storage area 14 is configured to hold various articles. The first storage area 14 may be disposed forward of the vehicle's stick shift. The first storage area 14 is exposed to the cabin space of the vehicle, and below the instrument panel assembly.

Figure 1:
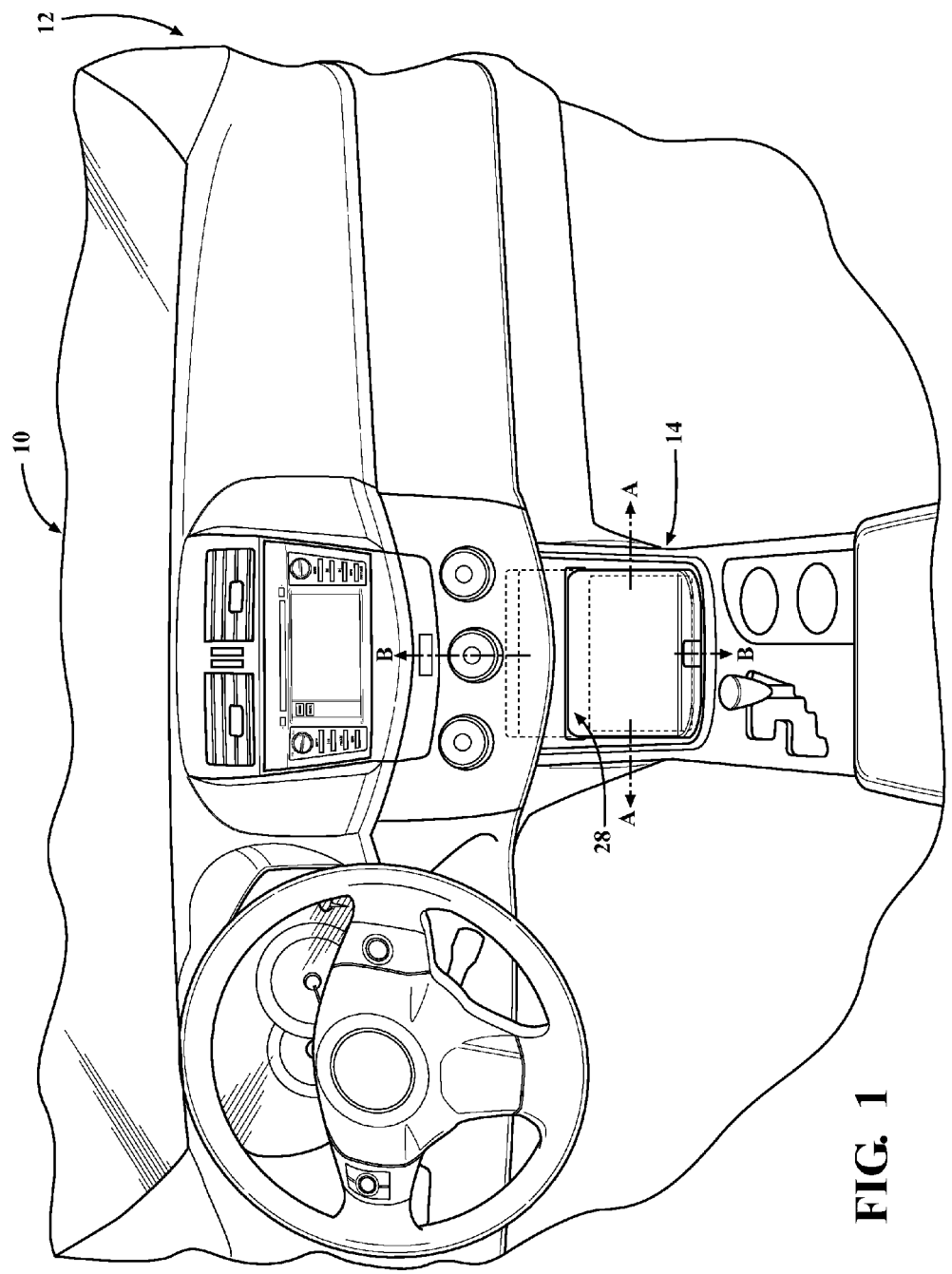
FIG. 1 is perspective view of the console assembly showing the slidable support in a covered position.
Figure 2:
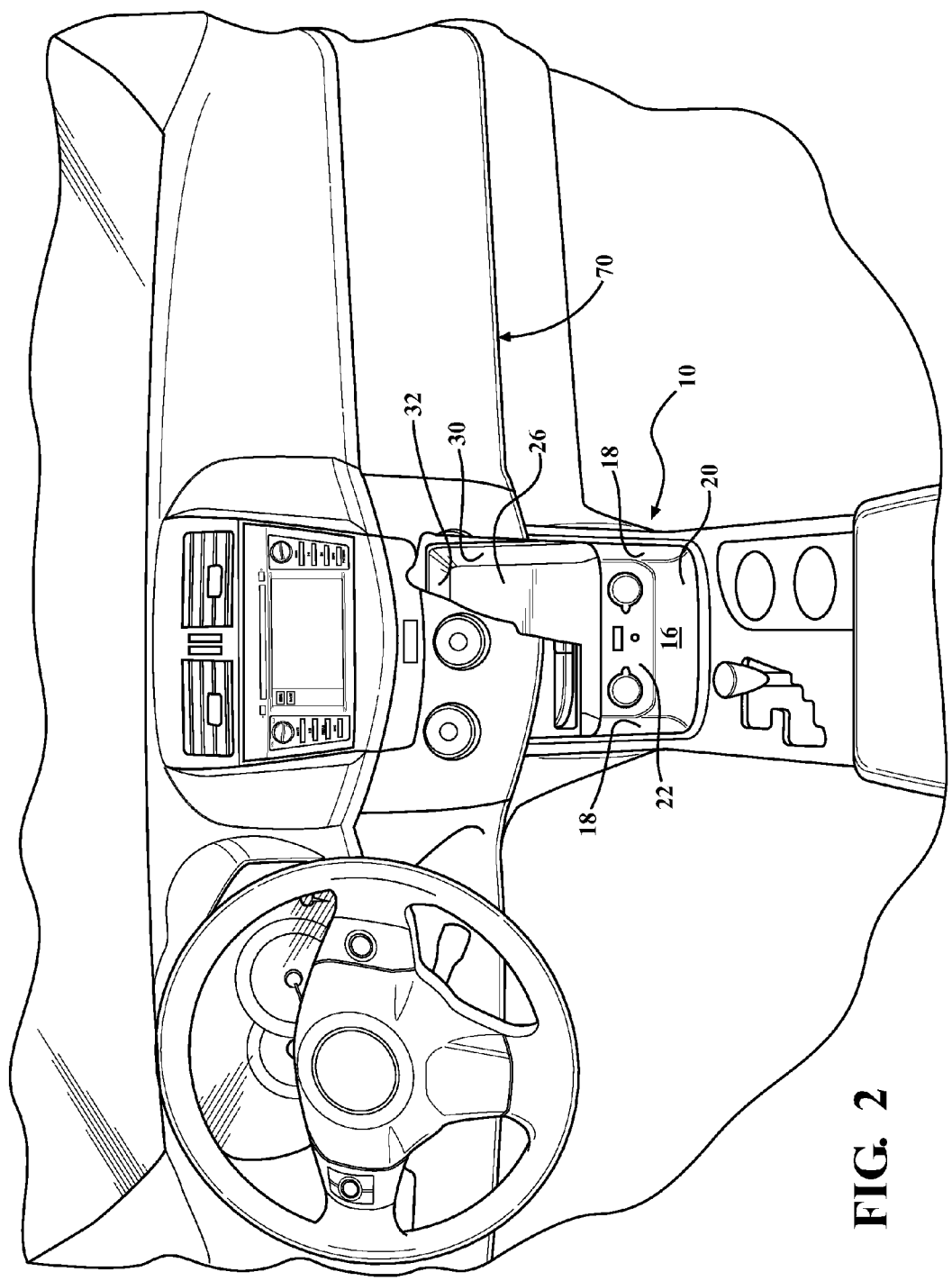
FIG. 2 is view of FIG. 1 showing the slidable support in a retracted position.
Figure 3:
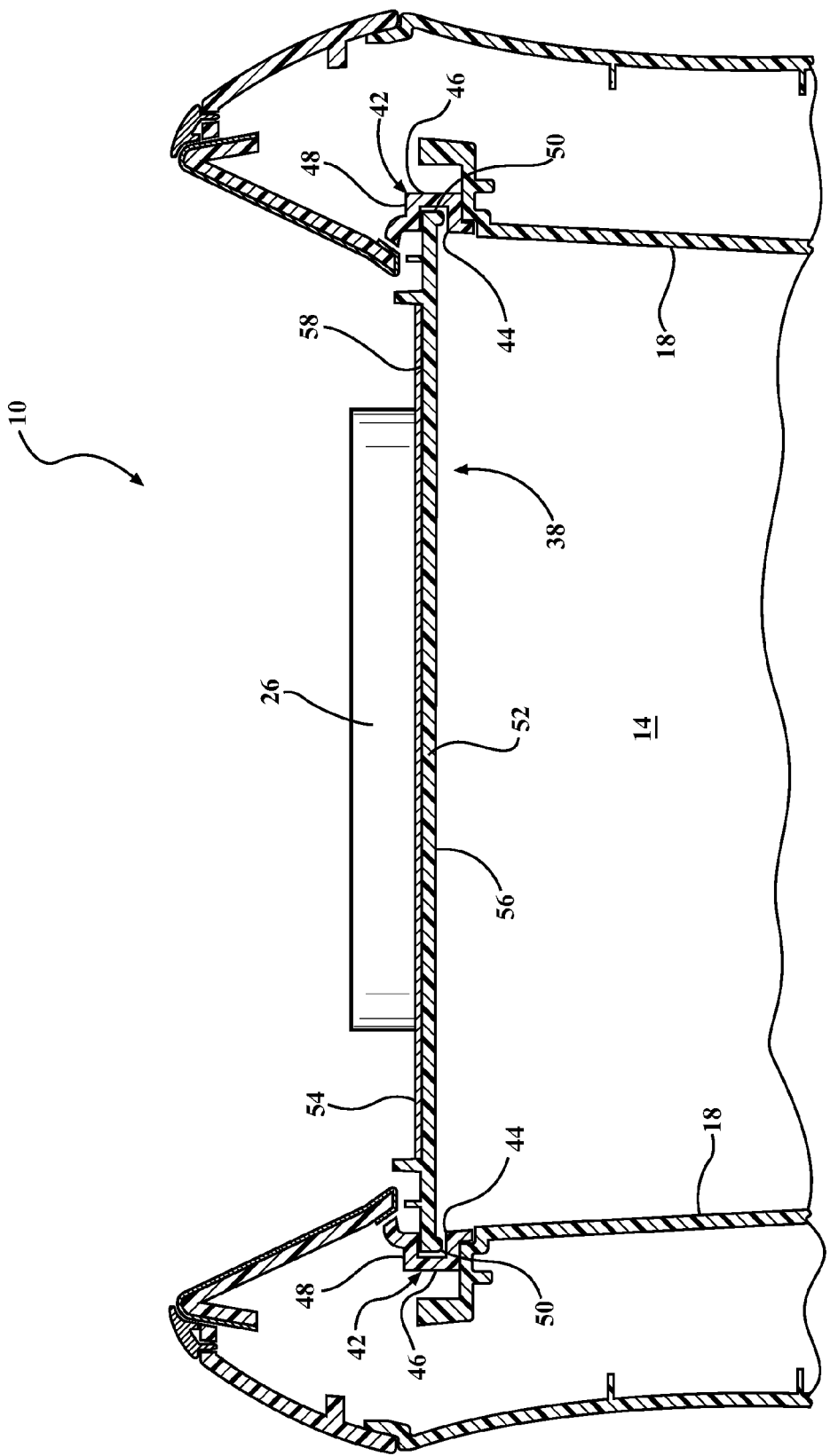
FIG. 3 is an exploded view of the cross section of the console assembly of FIG. 1, taken along lines A-A.
Figure 4:
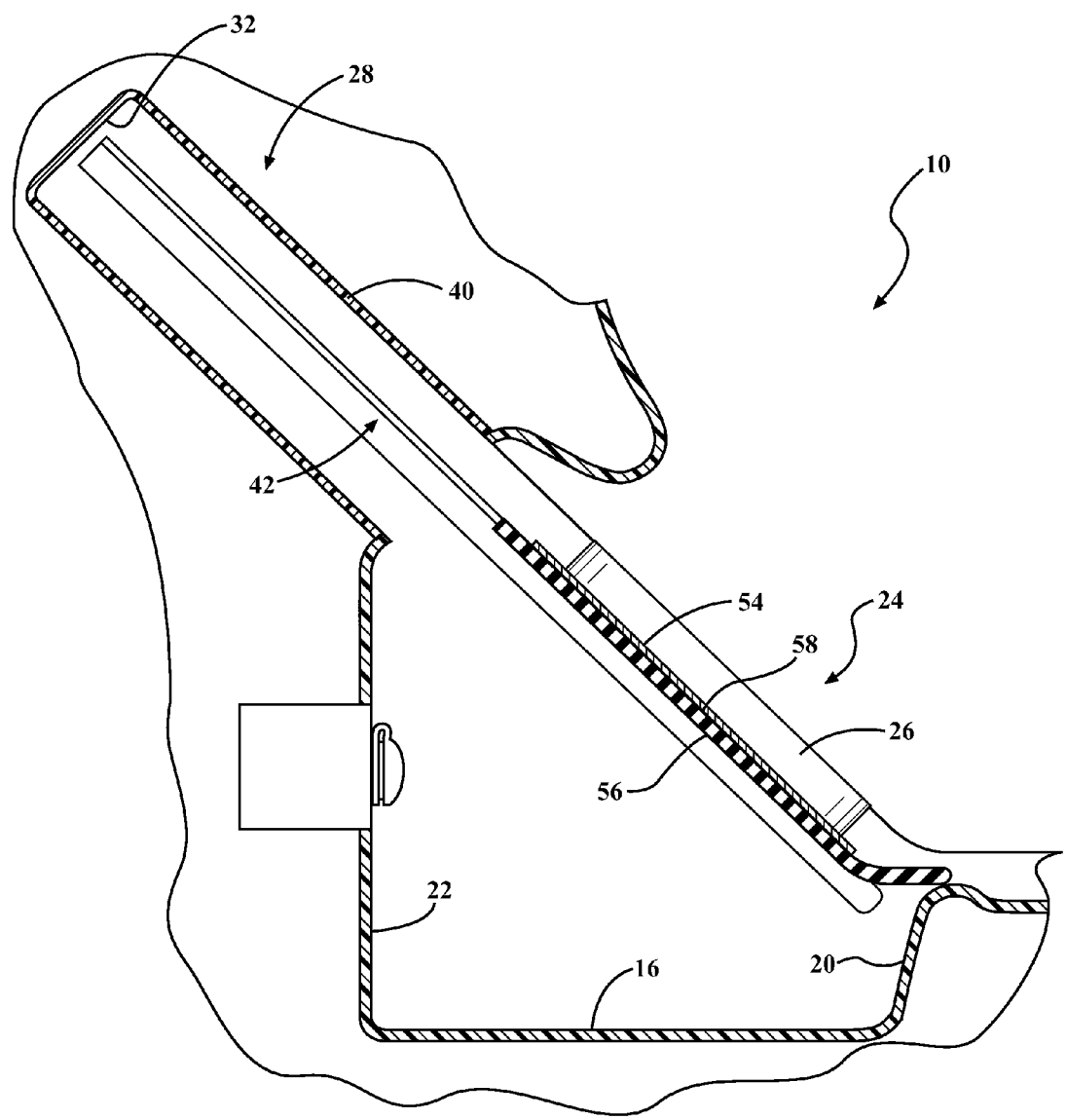
FIG. 4 is a cross-sectional view of the console assembly of FIG. 1, taken along lines B-B.
Figure 5:
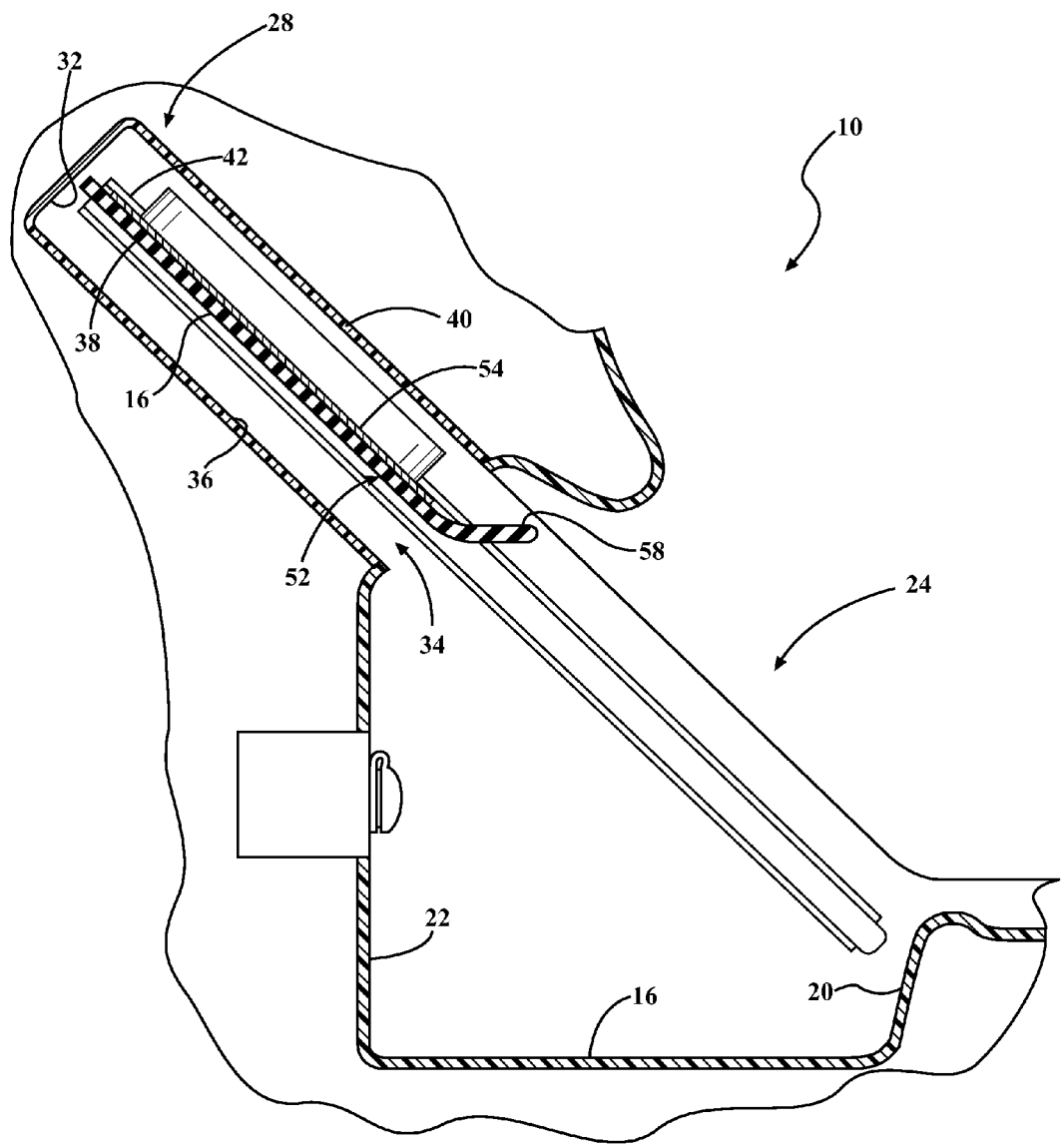
FIG. 5 is a view of FIG. 4 showing the slidable support in the retracted position.

With reference now to FIGS. 1, 2 and 4 an illustration of the first storage area 14 is provided. The first storage area 14 includes a first floor 16, a pair of first side walls 18, a first front wall 20, and a first back wall 22. Each of the first side walls 18 extend upwardly between opposite sides of the first floor 16 and extend along a plane oriented along the length of the vehicle, as indicated generally by line B-B. The first front wall 20 is disposed rearward of the first back wall 22 with respect to the front of the vehicle. The first front wall 20, the first back wall 22 and first side walls 18 define a storage space having a first opening 24 operable to receive articles.

The first floor 16 may be disposed along a plane which is generally horizontal. Each of the first side walls 18 may be angled relative to the first floor 16 so as to extend obtusely as measured from the outer surface of the first floor 16 and the outer surface of each of the first side walls 18. Likewise, the front wall may be disposed obtusely as measured from the outer surface of the first floor 16 and the outer surface of the front wall. The first storage area 14 is configured to hold articles such as a handheld electronic device 26.

The first storage area 14 may be configured to house various vehicle components. For instance, the first storage area 14 may include a plurality of electrical ports for transmitting electricity to an electronic device 26. One of the electrical ports may be a USB port, or a cigarette lighter. The electrical ports may be disposed on the first back wall 22, or one of the pair of first side walls 18.

The console assembly 10 may further include a second storage area 28. The second storage area 28 is recessed behind an outer surface of the instrument panel assembly and generally hidden from view. The second storage area 28 is disposed underneath the head unit of the vehicle and generally centered between the front passenger and driver seat.

The second storage area 28 includes a pair of second side walls 30, a second back wall 32, and a second opening 34 spaced apart and opposite the second back wall 32. Each of the second side walls 30 extend along a plane oriented along the length of the vehicle and is coplanar with a respective one of each of the pair of first side walls 18, along a plane oriented generally along line B-B.

The second opening 34 extends between each of the pair of second side walls 30. The second storage area 28 may further include a second floor 36. The second floor 36 is disposed above the first floor 16 of the first storage area 14. The second opening 34 is generally coplanar with respect to the first back wall 22. So as to define a box, having a pair of second side walls 30, a second back wall 32 and a second floor 36.

The console assembly 10 may further include a slidable support 38. The slidable support 38 is configured to support an electronic device 26 such as a hand held mobile phone. The slidable support 38 is operable to slide between a covered position to a retracted position. In the covered position the slidable support 38 is disposed between the pair of first side walls 18 and covers the first storage area 14 so as to prevent access thereto. In the retracted position the slidable support 38 is disposed within the second storage area 28, and between each of the pair of second side walls 30 thus providing access to the first opening 24. The slidable support 38 may disposed along a plane angled relative to the first floor 16 of the first storage area 14.

The second storage area 28 may further include a top wall 40 extending between each of the pair of second side walls 30, so as to be above the slidable support 38 when the slidable support 38 is in the retracted position. A portion of the top wall 40 may extend over the first floor 16. The top wall 40 is spaced apart the slidable support 38 so as to provide clearance for a handheld electronic device 26 to be supported by the slidable support 38 when the slidable support 38 is in the retracted position.

Each of the pair of first and second side walls 18, 30 is spaced apart from each other. As shown in the figures, the pair of first and second side walls 18, 30 are coplanar with each other so as to present a uniform and planar surface extending between the first and second storage areas 14, 28. The rails 42 are mounted on this uniform and planar surface so as to allow the slidable support 38 to move between the second storage area 28 and the first storage area 14.

The console assembly 10 may further include a pair of rails 42. The One of the pair of rails 42 mounted on one of the first and second pair side walls 18, 30 sharing the same plane, the other of the pair of rails 42 mounted on the other of the first and second pair of side walls 18, also sharing the same plane. The slidable support 38 is mounted between each of the pair of rails 42 and is slidable along the pair of rails 42.

The rails 42 are generally symmetrical to each other and thus a discuss of one rail 42 is sufficient to illustrate the other. The rails 42 are recessed within the first and second side walls 18, 30. The rails 42 include a sliding edge 44, a sliding wall 46 and a sliding top wall 48. The sliding wall 46 is displaced inwardly relative to the outer surface of respective first and second side walls 18, 30. The sliding edge 44 is spaced apart and beneath the sliding top wall 48.

The slidable support 38, may include a pair of side edges 50. Each of the pair of side edges 50 is slidably engaged with a corresponding one of the pair of rails 42. Specifically, each side edge 50 is slidable engaged to the respective slide edges 44, 50. The sliding wall 46 and sliding top wall 48 retains the slidable support 38 between the first and second storage areas 14, 28. The side edges 50 are slid along the sliding edge 44 of the rails 42.

The slidable support 38 may be formed from a polymer through an injection molding process. The slidable support 38 is a generally planar panel 52 having a top surface 54 exposed to the environment and a bottom surface 56 exposed to the first floor 16. The planar panel 52 may include a frictional skin 58 operable to hold an electronic device 26 in a fixed position relative to the angled slidable support 38.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A console assembly for use in an automotive vehicle, the console assembly comprising:
    a first storage area having a first floor disposed on a generally horizontal plane, a pair of first side walls, a first front wall, and a first back wall having a top edge;
    a second storage area having a pair of second side walls, a second back wall, a top wall, a second floor and a second opening spaced apart and opposite the second back wall, the second opening extending between each second side wall in the pair of second side walls, the second storage area disposed above the first floor of the first storage area, the second opening generally parallel to the second back wall of the second storage area, the second floor angled relative to the first back wall of the first storage area, the second back wall completely elevated relative to the top edge of the first back wall; and
    a slidable support, the slidable support disposed along a plane generally parallel to the second floor of the second storage area, the slidable support spaced apart from the top wall, the slidable support configured to slide between a covered position and a retracted position, wherein in the covered position the slidable support covers the first storage area, and in the retracted position the slidable support is disposed within the second storage area and between the pair of second side walls so as to provide access to the first storage area.

2. The console assembly as set forth in claim 1, further including a pair of rails disposed along a plane angled relative to the first floor of the first storage area, one of the first side walls in the pair of first side walls is spaced apart from the other first side wall in the pair first side walls, and one of the second side walls in the pair of second side walls is spaced apart from the other second side wall in the pair of second side walls, wherein one rail in the pair of rails is mounted onto both one of the pair of first side walls and one of the pair of second side walls, the other of the pair of rails is mounted onto the other of the pair of first side walls and the other of the pair of second side walls, the slidable support slidable along the pair of rails.

3. The console assembly as set forth in claim 1, wherein the slidable support includes a top surface exposed to the environment and a bottom surface exposed to the first floor.

4. The console assembly as set forth in claim 1, further including at least one electrical port mounted on the first back wall.

5. The console assembly as set forth in claim 2, wherein the slidable support includes a pair of side edges, each of the pair of side edges slidably engaged with a corresponding one of the pair of rails.

* * * * *